United States Patent
Vangala et al.

(10) Patent No.: US 12,052,764 B2
(45) Date of Patent: *Jul. 30, 2024

(54) BASE STATION (BS) RACH PROCEDURES FOR REDUCED LATENCY IN HIGH-PROPAGATION-DELAY NETWORKS

(71) Applicant: Apple Inc., Cupertino, CA (US)

(72) Inventors: Sarma V Vangala, Campbell, CA (US); Tarik Tabet, Los Gatos, CA (US); Chunxuan Ye, San Diego, CA (US); Dawei Zhang, San Diego, CA (US); Fangli Xu, Beijing (CN); Haijing Hu, Beijing (CN); Murtaza A Shikari, Mountain View, CA (US); Naveen Kumar R Palle Venkata, San Diego, CA (US); Ralf Rossbach, Munich (DE); Sreevalsan Vallath, Dublin, CA (US); Srinivasan Nimmala, San Jose, CA (US); Wei Zeng, San Diego, CA (US)

(73) Assignee: Apple Inc., Cupertino, CA (US)

( * ) Notice: Subject to any disclaimer, the term of this patent is extended or adjusted under 35 U.S.C. 154(b) by 224 days.

This patent is subject to a terminal disclaimer.

(21) Appl. No.: 17/437,394

(22) PCT Filed: Aug. 6, 2020

(86) PCT No.: PCT/CN2020/107326
§ 371 (c)(1),
(2) Date: Sep. 8, 2021

(87) PCT Pub. No.: WO2022/027412
PCT Pub. Date: Feb. 10, 2022

(65) Prior Publication Data
US 2022/0322446 A1   Oct. 6, 2022

(51) Int. Cl.
*H04W 74/0833* (2024.01)
*H04W 28/02* (2009.01)
(Continued)

(52) U.S. Cl.
CPC ... *H04W 74/0833* (2013.01); *H04W 28/0278* (2013.01); *H04W 72/23* (2023.01); *H04W 74/004* (2013.01)

(58) Field of Classification Search
None
See application file for complete search history.

(56) References Cited

U.S. PATENT DOCUMENTS 10,638,505 B1 * 4/2020 Manchanda ...... H04W 28/0278
11,304,235 B2 * 4/2022 Liu ................... H04W 74/0833
(Continued)

FOREIGN PATENT DOCUMENTS

| CN | 106686750 A | 5/2017 |
| CN | 107241764 A | 10/2017 |

(Continued)

OTHER PUBLICATIONS

International Search Report for PCT Patent Application No. PCT/CN2020/107326; mailed Apr. 29, 2021.
(Continued)

*Primary Examiner* — Otis L Thompson, Jr
(74) *Attorney, Agent, or Firm* — Kowert, Hood, Munyon, Rankin & Goetzel, P.C.

(57) ABSTRACT

This disclosure relates to techniques for reducing latency in a high-propagation-delay wireless communication system. A base station may receive from user equipment device (UE) a random access initiation message, having a characteristic that is configured to indicate to the base station a requested size of a subsequent uplink grant to be provided by the base station for transmission of uplink data by the UE. For
(Continued)

example, the characteristic may include a predetermined preamble included in the random access initiation message, such that a requested grant size is indicated by which preamble the UE selects from a plurality of possible preambles. As another example, the characteristic may include which RACH occasion is selected by the UE to transmit the random access initiation message. In response, the base station may allocate resources for use by the UE based on the characteristic.

6 Claims, 7 Drawing Sheets

(51) Int. Cl.
  *H04W 72/23* (2023.01)
  *H04W 74/00* (2009.01)

(56) References Cited

U.S. PATENT DOCUMENTS

| | | | |
|---|---|---|---|
| 11,770,216 B2* | 9/2023 | Utkovski | H04W 74/0833 370/329 |
| 2020/0214044 A1* | 7/2020 | Qian | H04W 52/50 |
| 2020/0374943 A1* | 11/2020 | Sun | H04W 74/0841 |
| 2021/0007138 A1* | 1/2021 | Xu | H04L 5/0044 |
| 2021/0092775 A1* | 3/2021 | Uchino | H04W 74/02 |
| 2021/0259040 A1* | 8/2021 | Babaei | H04W 72/23 |
| 2021/0360469 A1* | 11/2021 | Shrestha | H04W 72/23 |
| 2021/0368551 A1* | 11/2021 | Xiong | H04W 72/0453 |
| 2022/0368468 A1* | 11/2022 | Xiong | H04W 76/27 |
| 2022/0408478 A1* | 12/2022 | Christoffersson | H04W 74/0833 |
| 2023/0217506 A1* | 7/2023 | Löhr | H04W 74/006 370/329 |

FOREIGN PATENT DOCUMENTS

CN 108430112 A 8/2018
WO 2019157945 A1 8/2019

OTHER PUBLICATIONS

LG Electronics "Data transmission during random access procedure in NB-IoT"; 3GPP TSG RAN WG1 Meeting 92 R1-1802168; Athens, Greece; Feb. 26-Mar. 2, 2018.

* cited by examiner

BASE STATION (BS) RACH PROCEDURES FOR REDUCED LATENCY IN HIGH-PROPAGATION-DELAY NETWORKS

PRIORITY CLAIM INFORMATION

This application is a national stage application of International Application No. PCT/CN2020/107326, filed on Aug. 6, 2020, titled "Base Station (BS) RACH Procedures for Reduced Latency in High-Propagation-Delay Networks", which is hereby incorporated by reference in its entirety.

FIELD

The present application relates to wireless communications, and more particularly to systems, apparatus, and methods for reducing latency in a high-propagation-delay wireless communication system.

DESCRIPTION OF THE RELATED ART

Wireless communication systems are rapidly growing in usage. In recent years, wireless devices such as smart phones and tablet computers have become increasingly sophisticated. In addition to supporting telephone calls, many mobile devices (i.e., user equipment devices or UEs) now provide access to the internet, email, text messaging, and navigation using the global positioning system (GPS), and are capable of operating sophisticated applications that utilize these functionalities. Additionally, there exist numerous different wireless communication technologies and standards. Some examples of wireless communication standards include GSM, UMTS (associated with, for example, WCDMA or TD-SCDMA air interfaces), LTE, LTE Advanced (LTE-A), NR, HSPA, 3GPP2 CDMA2000 (e.g., 1×RTT, 1×EV-DO, HRPD, eHRPD), IEEE 802.11 (WLAN or Wi-Fi), BLUETOOTH™ etc.

The ever increasing number of features and functionality introduced in wireless communication devices also creates a continuous need for improvement in both wireless communications and in wireless communication devices. In particular, as diverse network technologies are integrated with more traditional cellular network technologies, new network characteristics may arise. As one example, introducing new classes of cellular base stations or repeater stations may introduce propagation delays that are noticeably greater, and noticeably more variable, than those associated with more traditional base stations. These characteristics may lead to a degraded user experience in such networks. Accordingly, improvements in the field are desired.

SUMMARY

Embodiments are presented herein of apparatus, systems, and methods for reducing latency in a high-propagation-delay wireless communication system.

According to the techniques described herein, a base station may be configured to receive from a wireless device a random access initiation message, wherein a characteristic of the random access initiation message is configured to indicate a requested size of a subsequent uplink grant provided by the base station for transmission of uplink data by the wireless device. In response to the random access initiation message, the base station may allocate resources for transmission by the wireless device, wherein the quantity of resources allocated is based on the characteristic of the random access message. The base station may transmit to the wireless device an uplink grant identifying the allocated resources, and may receive an uplink data message from the wireless device, using the allocated resources.

In some scenarios, the characteristic may be one or more of a random access preamble or a random access channel (RACH) occasion.

In some scenarios, wherein the characteristic of the random access initiation message may be a predefined preamble, and the random access initiation message may include one of a plurality of possible preambles. The base station may be further configured to determine the quantity of resources to allocate for transmission by the wireless device based on which of the possible preambles is included in the random access initiation message. In some such scenarios, each of at least a plural subset of the preambles may be configured to specify a respective different size of uplink grant. In some such scenarios, a first preamble may indicate an uplink grant having a size sufficient for uplink data, and second preamble may indicate an uplink grant having a size sufficient to transmit a buffer status report, but insufficient to transmit uplink data.

In some scenarios, the characteristic of the random access initiation message may be a predefined RACH occasion, and the random access initiation message may be configurable to use one of a plurality of possible RACH occasions. The base station may be further configured to determine the quantity of resources to allocate for transmission by the wireless device based on which RACH occasion of the plurality of possible RACH occasions is included in the random access initiation message. In some such scenarios, a first RACH occasion may indicate an uplink grant having a size sufficient for uplink data, and a second RACH occasion may indicate an uplink grant having a size sufficient to transmit a buffer status report, but insufficient to transmit uplink data.

In some scenarios, the uplink data message received using the allocated resources may further include a buffer status report. The base station may be further configured to allocate additional resources for transmission by the wireless device, wherein the quantity of additional resources allocated is based on the buffer status report; and transmit to the wireless device a second uplink grant identifying the additional allocated resources.

Apparatus and methods are also disclosed, having features similar to those outlined above.

Note that the techniques described herein may be implemented in and/or used with a number of different types of devices, including but not limited to base stations, access points, cellular phones, portable media players, tablet computers, wearable devices, unmanned aerial vehicles, unmanned aerial controllers, automobiles and/or motorized vehicles, and various other computing devices.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of various embodiments is considered in conjunction with the following drawings, in which.

Figure 1:
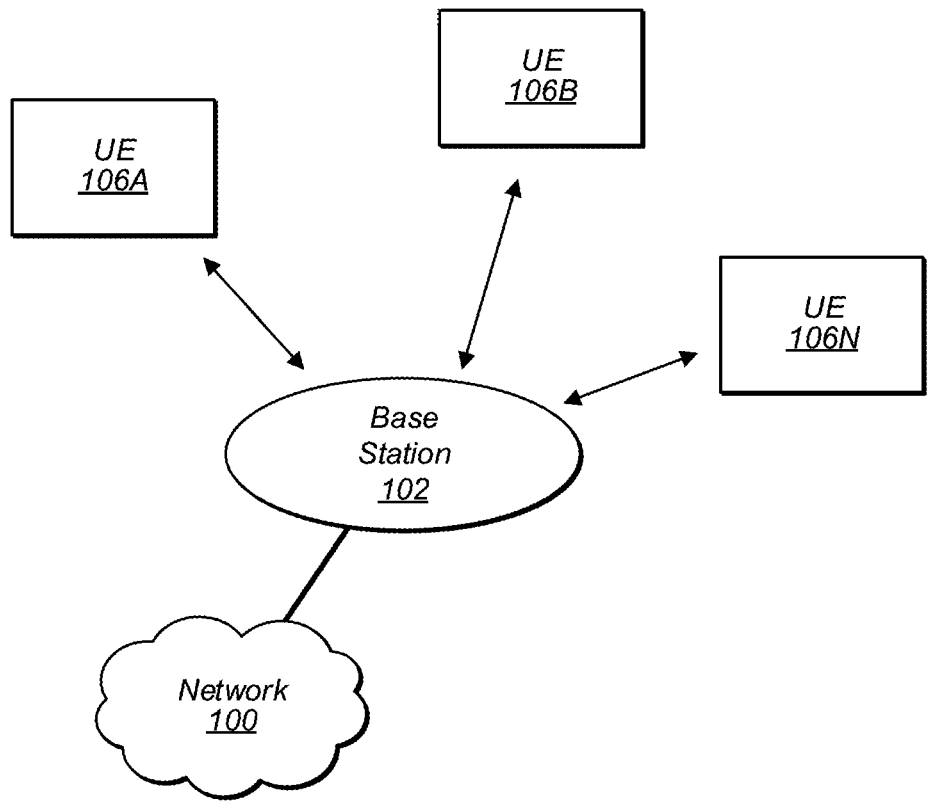
FIG. 1 illustrates an exemplary (and simplified) wireless communication system, according to some embodiments.

While features described herein are susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Acronyms

Various acronyms are used throughout the present disclosure. Definitions of the most prominently used acronyms that may appear throughout the present disclosure are provided below:

BS: Base Station
BSR: Buffer Status Report
CQI: Channel Quality Indicator
CSI: Channel State Information
CSI-RS: Channel State Information Reference Signals
DL: Downlink
GSM: Global System for Mobile Communication
IE: Information Element
LI: Layer Indicator
LTE: Long Term Evolution
MCS: Modulation and Coding Scheme
NR: New Radio
PDSCH: Physical Downlink Shared Channel
PMI: Precoding Matrix Indicator
PRACH: Physical Random Access Channel
RACH: Random Access Channel
RAT: Radio Access Technology
RF: Radio Frequency
RI: Rank Indicator
RO: RACH Occasion
RSRP: Reference Signal Received Power
RX: Reception/Receive
SINR: Signal-to-Interference plus Noise Ratio
SR: Scheduling Request
SSB: Synchronization Signal Block
TX: Transmission/Transmit
UE: User Equipment
UL: Uplink
UMTS: Universal Mobile Telecommunication System Terms The following is a glossary of terms that may appear in the present disclosure:

Memory Medium—Any of various types of non-transitory memory devices or storage devices. The term "memory medium" is intended to include an installation medium, e.g., a CD-ROM, floppy disks, or tape device: a computer system memory or random access memory such as DRAM, DDR RAM, SRAM, EDO RAM, Rambus RAM, etc.: a non-volatile memory such as a Flash, magnetic media, e.g., a hard drive, or optical storage: registers, or other similar types of memory elements, etc. The memory medium may comprise other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer system for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Computer System (or Computer)—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" may be broadly defined to encompass any device (or combination of devices) having at least one processor that executes instructions from a memory medium.

User Equipment (UE) (or "UE Device")—any of various types of computer systems or devices that are mobile or portable and that perform wireless communications. Examples of UE devices include mobile telephones or smart phones (e.g., iPhone™, Android™-based phones), tablet computers (e.g., iPad™, Samsung Galaxy™), portable gaming devices (e.g., Nintendo DS™, PlayStation Portable™, Gameboy Advance™, iPhone™), wearable devices (e.g., smart watch, smart glasses), laptops, PDAs, portable Internet devices, music players, data storage devices, other handheld devices, automobiles and/or motor vehicles, unmanned aerial vehicles (UAVs) (e.g., drones), UAV controllers (UACs), etc. In general, the term "UE" or "UE device" can be broadly defined to encompass any electronic, computing, and/or telecommunications device (or combination of devices) which is easily transported by a user and capable of wireless communication.

Wireless Device—any of various types of computer systems or devices that perform wireless communications. A wireless device can be portable (or mobile) or may be stationary or fixed at a certain location. A UE is an example of a wireless device.

Communication Device—any of various types of computer systems or devices that perform communications, where the communications can be wired or wireless. A communication device can be portable (or mobile) or may be stationary or fixed at a certain location. A wireless device is an example of a communication device. A UE is another example of a communication device.

Base Station (BS)—The term "Base Station" has the full breadth of its ordinary meaning, and at least includes a wireless communication station installed at a fixed location and used to communicate as part of a wireless telephone system or radio system.

Processing Element (or Processor)—refers to various elements or combinations of elements that are capable of performing a function in a device, e.g., in a user equipment device or in a cellular network device. Processing elements may include, for example: processors and associated memory, portions or circuits of individual processor cores, entire processor cores, processor arrays, circuits such as an ASIC (Application Specific Integrated Circuit), programmable hardware elements such as a field programmable gate array (FPGA), as well any of various combinations of the above.

Wi-Fi—The term "Wi-Fi" has the full breadth of its ordinary meaning, and at least includes a wireless communication network or RAT that is serviced by wireless LAN (WLAN) access points and which provides connectivity through these access points to the Internet. Most modern Wi-Fi networks (or WLAN networks) are based on IEEE 802.11 standards and are marketed under the name "Wi-Fi". A Wi-Fi (WLAN) network is different from a cellular network.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Configured to—Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112, paragraph six, interpretation for that component.

Figure 2:
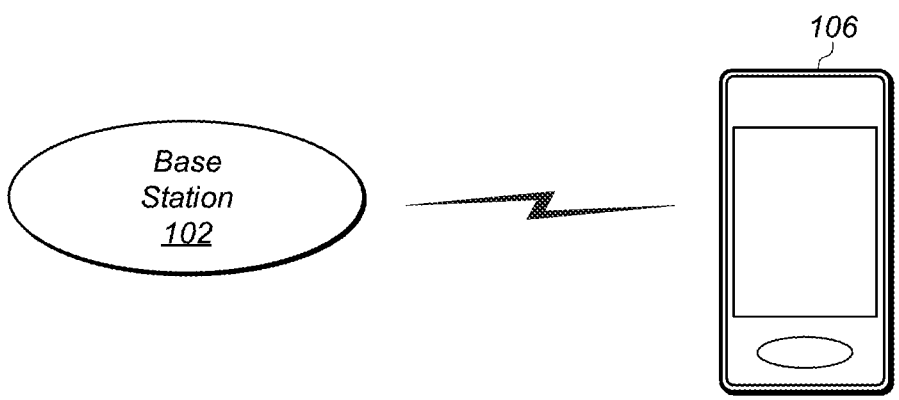
FIG. 2 illustrates an exemplary base station in communication with an exemplary wireless user equipment (UE) device, according to some embodiments.

FIGS. 1 and 2—Exemplary Communication System

FIG. 1 illustrates an exemplary (and simplified) wireless communication system in which aspects of this disclosure may be implemented, according to some embodiments. It is noted that the system of FIG. 1 is merely one example of a possible system, and embodiments may be implemented in any of various systems, as desired.

As shown, the exemplary wireless communication system includes a base station 102 which communicates over a transmission medium with one or more (e.g., an arbitrary number of) user devices 106A, 106B, etc. through 106N. Each of the user devices may be referred to herein as a "user equipment" (UE) or UE device. Thus, the user devices 106 are referred to as UEs or UE devices.

The base station 102 may be a base transceiver station (BTS) or cell site, and may include hardware and/or software that enables wireless communication with the UEs 106A through 106N. If the base station 102 is implemented in the context of LTE, it may alternately be referred to as an 'eNodeB' or 'eNB'. If the base station 102 is implemented in the context of 5G NR, it may alternately be referred to as a 'gNodeB' or 'gNB'. The base station 102 may also be equipped to communicate with a network 100 (e.g., a core network of a cellular service provider, a telecommunication network such as a public switched telephone network (PSTN), and/or the Internet, among various possibilities). Thus, the base station 102 may facilitate communication among the user devices and/or between the user devices and the network 100. The communication area (or coverage area) of the base station may be referred to as a "cell." As also used herein, from the perspective of UEs, a base station may sometimes be considered as representing the network insofar as uplink and downlink communications of the UE are concerned. Thus, a UE communicating with one or more base stations in the network may also be interpreted as the UE communicating with the network.

The base station 102 and the user devices may be configured to communicate over the transmission medium using any of various radio access technologies (RATs), also referred to as wireless communication technologies, or telecommunication standards, such as GSM, UMTS (WCDMA), LTE, LTE-Advanced (LTE-A), LAA/LTE-U, 5G NR, 3GPP2 CDMA2000 (e.g., 1xRTT, 1xEV-DO, HRPD, eHRPD), Wi-Fi, etc.

Base station 102 and other similar base stations operating according to the same or a different cellular communication standard may thus be provided as one or more networks of cells, which may provide continuous or nearly continuous overlapping service to UE 106 and similar devices over a geographic area via one or more cellular communication standards.

Note that a UE 106 may be capable of communicating using multiple wireless communication standards. For example, a UE 106 might be configured to communicate using either or both of a 3GPP cellular communication standard or a 3GPP2 cellular communication standard. In some embodiments, the UE 106 may be configured to perform techniques for reducing latency in a multi-beam wireless communication system, such as according to the various methods described herein. The UE 106 might also or alternatively be configured to communicate using WLAN, BLUETOOTH™, one or more global navigational satellite systems (GNSS, e.g., GPS or GLONASS), one and/or more mobile television broadcasting standards (e.g., ATSC-M/H), etc. Other combinations of wireless communication standards (including more than two wireless communication standards) are also possible.

FIG. 2 illustrates an exemplary user equipment 106 (e.g., one of the devices 106A through 106N) in communication with the base station 102, according to some embodiments. The UE 106 may be a device with wireless network connectivity such as a mobile phone, a hand-held device, a wearable device, a computer or a tablet, an unmanned aerial vehicle (UAV), an unmanned aerial controller (UAC), an automobile, or virtually any type of wireless device. The UE 106 may include a processor (processing element) that is configured to execute program instructions stored in memory. The UE 106 may perform any of the method embodiments described herein by executing such stored instructions. Alternatively, or in addition, the UE 106 may include a programmable hardware element such as an FPGA (field-programmable gate array), an integrated circuit, and/or any of various other possible hardware components that are configured to perform (e.g., individually or in combination) any of the method embodiments described herein, or any portion of any of the method embodiments described herein. The UE 106 may be configured to communicate using any of multiple wireless communication protocols. For example, the UE 106 may be configured to communicate using two or more of CDMA2000, LTE, LTE-A, 5G NR, WLAN, or GNSS. Other combinations of wireless communication standards are also possible.

The UE 106 may include one or more antennas for communicating using one or more wireless communication protocols according to one or more RAT standards. In some embodiments, the UE 106 may share one or more parts of a receive chain and/or transmit chain between multiple wireless communication standards. The shared radio may include a single antenna, or may include multiple antennas (e.g., for MIMO) for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware.

In some embodiments, the UE 106 may include separate transmit and/or receive chains (e.g., including separate antennas and other radio components) for each wireless communication protocol with which it is configured to communicate. As a further possibility, the UE 106 may include one or more radios that are shared between multiple wireless communication protocols, and one or more radios that are used exclusively by a single wireless communication protocol. For example, the UE 106 may include a shared radio for communicating using either of LTE or CDMA2000 1×RTT (or LTE or NR, or LTE or GSM), and separate radios for communicating using each of Wi-Fi and BLUETOOTH™. Other configurations are also possible.

Figure 3:
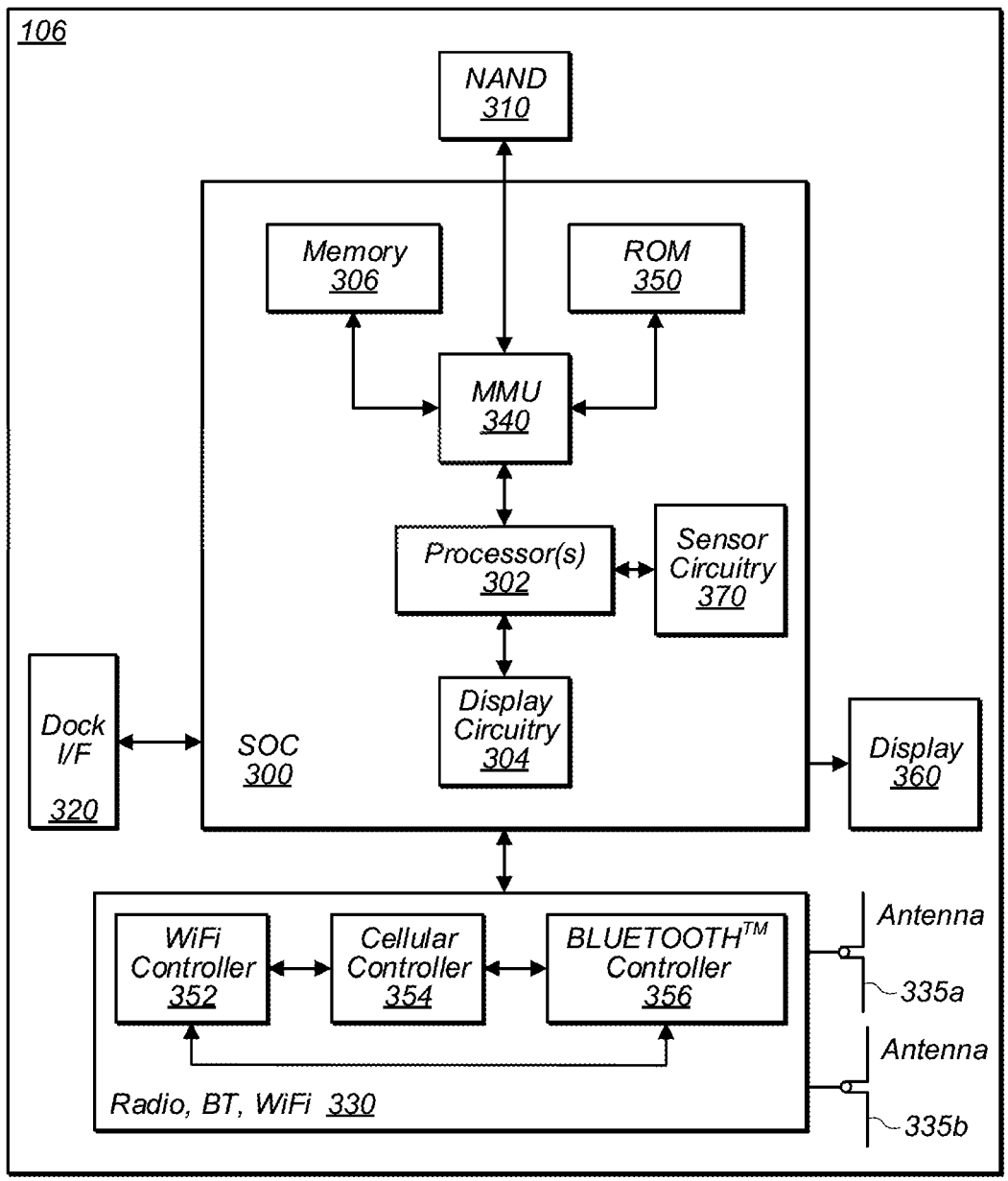
FIG. 3 illustrates an exemplary block diagram of a UE, according to some embodiments.

FIG. 3—Block Diagram of an Exemplary UE Device

FIG. 3 illustrates a block diagram of an exemplary UE 106, according to some embodiments. As shown, the UE 106 may include a system on chip (SOC) 300, which may include portions for various purposes. For example, as shown, the SOC 300 may include processor(s) 302 which may execute program instructions for the UE 106 and display circuitry 304 which may perform graphics processing and provide display signals to the display 360. The SOC 300 may also include sensor circuitry 370, which may include components for sensing or measuring any of a variety of possible characteristics or parameters of the UE 106. For example, the sensor circuitry 370 may include motion sensing circuitry configured to detect motion of the UE 106, for example using a gyroscope, accelerometer, and/or any of various other motion sensing components. As another possibility, the sensor circuitry 370 may include one or more temperature sensing components, for example for measuring the temperature of each of one or more antenna panels and/or other components of the UE 106. Any of various other possible types of sensor circuitry may also or alternatively be included in UE 106, as desired. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, radio 330, connector I/F 320, and/or display 360. The MMU 340 may be configured to perform memory protection and page table translation or set up. In some embodiments, the MMU 340) may be included as a portion of the processor(s) 302.

As shown, the SOC 300 may be coupled to various other circuits of the UE 106. For example, the UE 106 may include various types of memory (e.g., including NAND flash 310), a connector interface 320 (e.g., for coupling to a computer system, dock, charging station, etc.), the display 360, and wireless communication circuitry 330 (e.g., for LTE, LTE-A, NR, CDMA2000, BLUETOOTH™, Wi-Fi, GPS, etc.). The UE device 106 may include at least one antenna (e.g. 335a), and possibly multiple antennas (e.g. illustrated by antennas 335a and 335b), for performing wireless communication with base stations and/or other devices. Antennas 335a and 335b are shown by way of example, and UE device 106 may include fewer or more antennas. Overall, the one or more antennas are collectively referred to as antenna 335. For example, the UE device 106 may use antenna 335 to perform the wireless communication with the aid of radio circuitry 330. As noted above, the UE may be configured to communicate wirelessly using multiple wireless communication standards in some embodiments.

The UE 106 may include hardware and software components for implementing methods for the UE 106 to perform techniques for reducing latency in a multi-beam wireless communication system, such as described further subsequently herein. The processor(s) 302 of the UE device 106 may be configured to implement part or all of the methods described herein, e.g., by executing program instructions stored on a memory medium (e.g., a non-transitory computer-readable memory medium). In other embodiments, processor(s) 302 may be configured as a programmable hardware element, such as an FPGA (Field Programmable Gate Array), or as an ASIC (Application Specific Integrated Circuit). Furthermore, processor(s) 302 may be coupled to and/or may interoperate with other components as shown in FIG. 3, to perform techniques for reducing latency in a multi-beam wireless communication system according to various embodiments disclosed herein. Processor(s) 302 may also implement various other applications and/or end-user applications running on UE 106.

In some embodiments, radio 330) may include separate controllers dedicated to controlling communications for various respective RAT standards. For example, as shown in FIG. 3, radio 330 may include a Wi-Fi controller 352, a cellular controller (e.g. LTE-A and/or NR controller) 354, and BLUETOOTH™ controller 356, and in at least some embodiments, one or more or all of these controllers may be implemented as respective integrated circuits (ICs or chips, for short) in communication with each other and with SOC 300 (and more specifically with processor(s) 302). For example, Wi-Fi controller 352 may communicate with cellular controller 354 over a cell-ISM link or WCI interface, and/or BLUETOOTH™ controller 356 may communicate with cellular controller 354 over a cell-ISM link, etc. While three separate controllers are illustrated within radio 330, other embodiments have fewer or more similar controllers for various different RATs that may be implemented in UE device 106. In some embodiments, the cellular controller 354 may include a baseband processor configured to implement, or to cause the UE 106 to implement, one or more of the procedures disclosed herein, or a portion thereof.

Further, embodiments in which controllers may implement functionality associated with multiple radio access technologies are also envisioned. For example, according to some embodiments, the cellular controller 354 may, in addition to hardware and/or software components for performing cellular communication, include hardware and/or software components for performing one or more activities associated with Wi-Fi, such as Wi-Fi preamble detection, and/or generation and transmission of Wi-Fi physical layer preamble signals.

Figure 4:
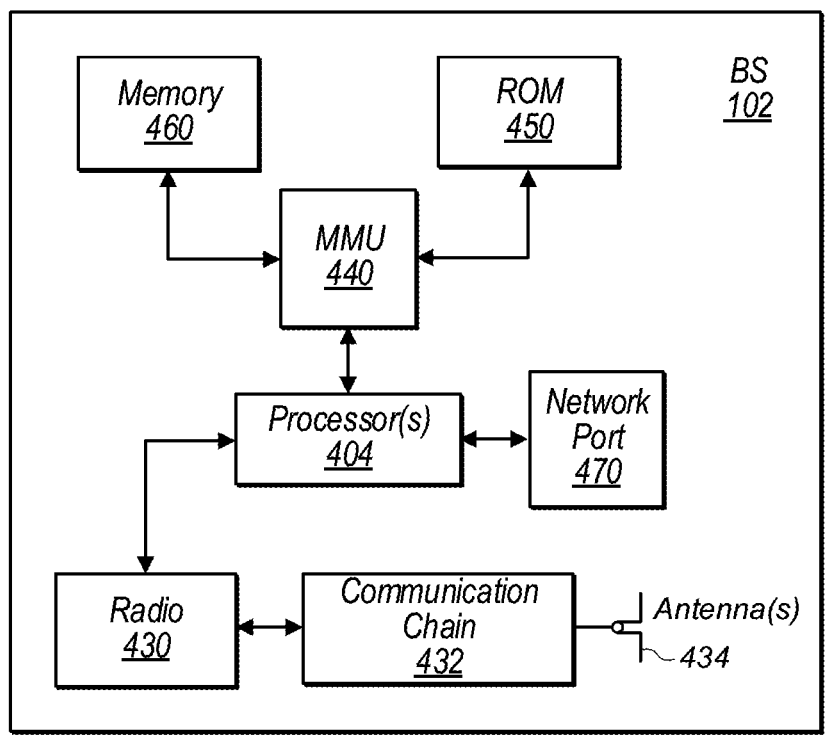
FIG. 4 illustrates an exemplary block diagram of a base station, according to some embodiments.

FIG. 4—Block Diagram of an Exemplary Base Station

FIG. 4 illustrates a block diagram of an exemplary base station 102, according to some embodiments. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460) and read only memory (ROM) 450) or to other circuits or devices.

The base station 102 may include at least one network port 470. The network port 470 may be configured to couple to a telephone network and provide a plurality of devices, such as UE devices 106, access to the telephone network as described above in FIGS. 1 and 2. The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470) may couple to a telephone network via the core network, and/or the core network may provide a telephone network (e.g., among other UE devices serviced by the cellular service provider).

The base station 102 may include at least one antenna 434, and possibly multiple antennas. The antenna(s) 434 may be configured to operate as a wireless transceiver and may be further configured to communicate with UE devices 106 via radio 430. The antenna(s) 434 communicates with the radio 430 via communication chain 432. Communication chain 432 may be a receive chain, a transmit chain or both. The radio 430 may be designed to communicate via various wireless telecommunication standards, including, but not limited to, NR, LTE, LTE-A WCDMA, CDMA2000, etc. The processor 404 of the base station 102 may be configured to implement and/or support implementation of part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof. In the case of certain RATs, for example Wi-Fi, base station 102 may be designed as an access point (AP), in which case network port 470 may be implemented to provide access to a wide area network and/or local area network (s), e.g., it may include at least one Ethernet port, and radio 430 may be designed to communicate according to the Wi-Fi standard.

High-Propagation-Delay Networks

As diverse network technologies are integrated with more traditional cellular network technologies, new network characteristics may arise. As one example, introducing new classes of cellular base stations or repeater stations may introduce propagation delays that are noticeably greater, and noticeably more variable, than those associated with more traditional base stations.

For example, 3GPP has engaged in multiple study items regarding integration of non-terrestrial networks (NTN) into the 3GPP ecosystem. See, e.g., 3GPP TR 38.811, 3GPP TR 22.822, 3GPP Work Item 860046 (sNR_NTN_solutions). In such systems, propagation delays between a UE, such as the UE 106, and a non-terrestrial network may be far greater than propagation delays between the UE and a traditional terrestrial base station. Additionally, such systems may include cells covering larger geographic areas than traditional cells, which may lead to a large differential in propagation delays at two points within a cell. In other words, in such systems, a UE located at a first point in a cell may experience a significantly greater propagation delay than a UE located at a second point in the same cell. Such delays and differentials may be multiplied by procedures requiring multiple round-trip communications.

Figure 5:
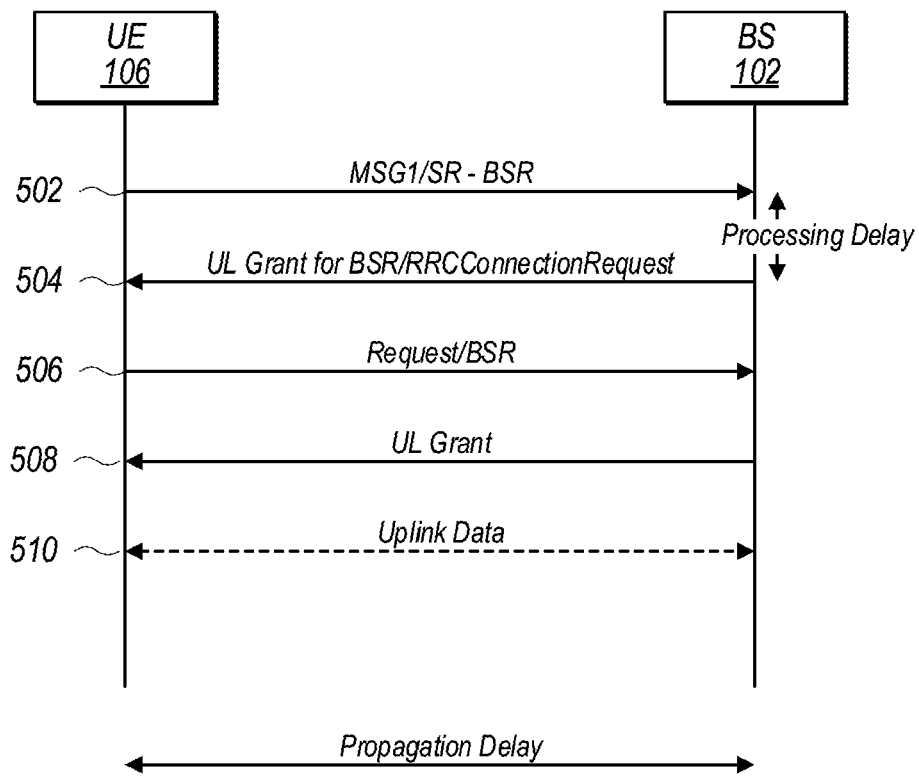
FIG. 5 is a communication flow diagram illustrating an example of a typical UL traffic call flow.

FIG. 5 is a communication flow diagram illustrating an example of a typical UL traffic call flow. As shown, a UE, such as the UE 106 may communicate with a base station, such as the BS 102.

The UE 106 may transmit to the BS 102 an initial grant request 502 for a reporting grant. In some scenarios, the initial grant request 502 may represent, or include, a scheduling request (SR) for requesting a BSR grant, e.g., as defined by 3GPP standards. In other scenarios, the initial grant request 502 may represent, or include, a random access (RA) initiation message, configured to initiate a procedure for random access communications with the BS 102. As one example, such a RA initiation message may include, or consist of, a RA preamble (sometimes also referred to as MSG1), as defined by 3GPP standards. Such a message may initiate a RACH procedure, such as a 4-step or 2-step RACH procedure as defined by 3GPP standards. Regardless of the format used, the initial grant request 502 may communicate an abbreviated request for allocation of resources to allow transmission of a more detailed report or request for resources. Because the initial grant request 502 initiates a new communication exchange, it may consist of a predefined value. For example, an SR may consist of a single bit, while MSG1 may consist of a predefined preamble. These signals do not include an uplink data payload. As used herein, the term "uplink data" refers to payload data of the UE 106, as differentiated from control signaling, etc. For example, a BSR is not considered uplink data.

In response to receiving the initial grant request 502, the BS 102 may transmit to the UE 106 a limited UL grant 504. The limited UL grant 504 may identify UL resources sufficient for the UE 106 to transmit a more detailed report or request for resources. For example, the limited UL grant 504 may include an UL grant for the UE 106 to transmit a BSR or similar report. As another example, if the initial grant request 502 included a RA preamble, then the limited UL grant 504 may include, or consist of, a RA response (sometimes also referred to as MSG2), as defined by 3GPP standards, which may include an UL grant for the UE 106 to transmit a further grant request, such as a RRC connection request. The limited UL grant 504 allocates resources sufficient for the UE 106 to transmit a more detailed report or request for resources, but not insufficient to transmit an uplink data payload. For example, in some scenarios, the limited UL grant 504 may allocate resources sufficient for the UE 106 to transmit approximately 60 bytes, or some similar value—e.g., significantly less than one MB.

In response to receiving the limited UL grant 504, the UE 106 may transmit to the BS 102 an extended UL grant request 506. For example, the extended UL grant request 506 may include, a buffer status report (BSR), which may report an amount of data buffered by the UE 106 for transmission to the BS 102. The BSR may represent a request to transmit to the BS 102 some quantity of data. In some scenarios, the BSR 506 may be formatted as defined by 3GPP standards. As another example, if the limited UL grant 504 included a RA response, then the extended UL grant request 506 may include a RRC connection request (sometimes also referred to as MSG3), as defined by 3GPP standards, which may include an UL grant for the UE 106 to transmit further communications.

In response to receiving the extended grant request 506, the BS 106 may transmit to the UE 106 an UL grant 508. The UL grant 508 may identify UL resources usable by the UE 106 to transmit uplink data. For example, the UL grant 508 may identify UL resources usable by the UE 106 to transmit at least a portion of the quantity of data identified in a BSR included in the extended grant request 506. The UL grant 508 may be significantly larger than the limited UL grant 504. For example, in some scenarios, the UL grant 508 may allocate resources sufficient for the UE 106 to transmit many MB—e.g., up to 80 MB.

In response to receiving the UL grant 508, the UE 106 may communicate uplink data 510 to the BS 102. As shown, the uplink data 510 may represent one or more transmissions of uplink data, and, in some scenarios, may also include one or more responses, such as ACK/NACK messages, from the BS 102.

Between receiving any of the signals illustrated in FIG. 5 and transmitting the next subsequent signal, the receiving device will introduce some processing delay as a result of processing the received signal. The duration of this delay is typically not impacted by the propagation time of the signals. Thus, the processing delay may remain relatively constant across networks of differing sizes. By contrast, the time-of-flight required for each individual signal to travel from the UE 106 to the BS 102, or vice versa, is defined as the propagation delay, and will increase with the distance between the UE 106 and the BS 102. Thus, a geographically large cell may experience a significantly longer delay in performing a procedure such as that shown in FIG. 5 than would be experienced in a geographically smaller cell. Additionally, a geographically large cell may experience a significant differential delay, meaning that the BS 102 may experience a significantly longer propagation delay when communicating with the UE 102, located at a first location within the cell, than it would experience when communicating with a second UE, located at a second location within the cell. As one example, a cell supported by a NTN may be of sufficient geographical size that such propagation delays and differential delays would become so large as to negatively impact the user experience when performing a BSR grant procedure as illustrated in FIG. 5.

Additionally, such long roundtrip propagation delays may exaggerate the effects of burstiness in two-way communications, in which, e.g., the UE 106 transmits a large amount of data, and must await acknowledgement of the entire set of data before performing additional communications. Extended propagation delays exacerbate the effects of such wait times.

Therefore, it would be advantageous if the process illustrated in FIG. 5 could be adapted for high-propagation-delay networks, to reduce latency between the initial grant request and reception of the uplink data UL grant. It would also be advantageous if the process could be adapted to smooth out the signal flow, to reduce burstiness.

Figure 6:
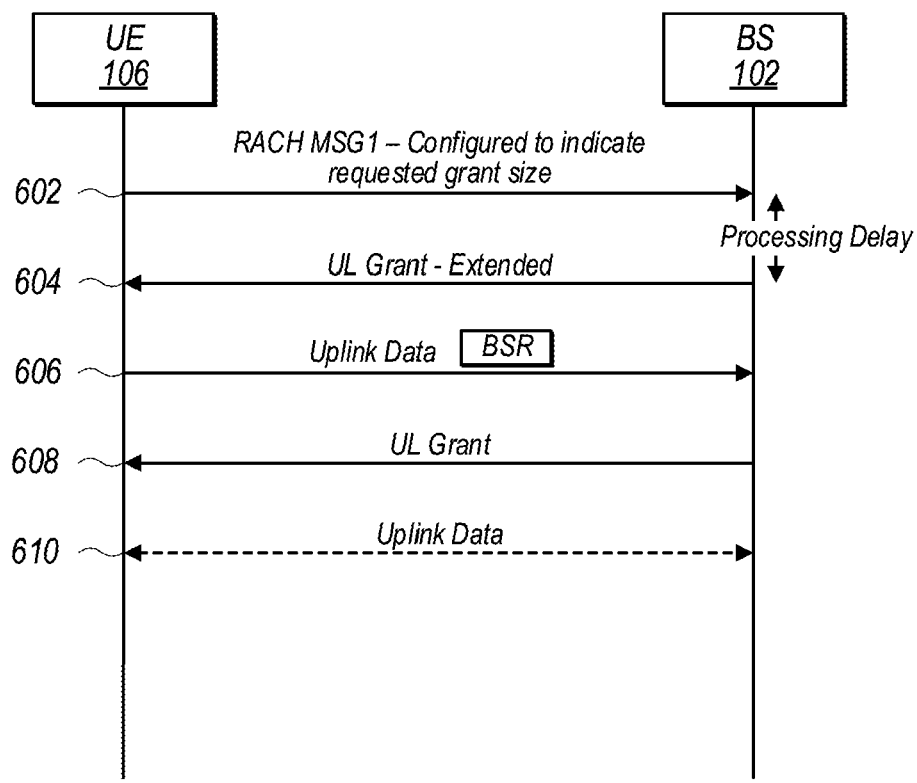
FIG. 6 is a communication flow diagram illustrating an example of an UL traffic call flow, in which a 4-step RA procedure has been modified to reduce latency between an initial grant request and reception of an uplink data UL grant, according to some embodiments.

FIG. 6—Modified PRACH for Reduced Latency

One approach to reducing latency between the initial grant request and reception of the uplink data UL grant in high-propagation-delay networks is to provide an initial uplink data UL grant immediately in response to an initial request, e.g., before the UE 106 transmits a BSR or similar report/request. This initial uplink data UL grant may allow the UE 106 to transmit at least a portion of its uplink data earlier than would be allowed according to the procedure illustrated in FIG. 5.

FIG. 6 is a communication flow diagram illustrating an example of an UL traffic call flow: in which a 4-step RA procedure has been modified to reduce latency between an initial grant request and reception of an uplink data UL grant, according to some embodiments.

As shown, the UE 106 may initiate the call flow by transmitting to the BS 102 a RA initiation message 602, such as a RA preamble, or a similar message. The RA initiation message 602 may be distinguished from the initial grant request 502 in that the RA initiation message 602 may be configured to indicate a type or size of UL grant that should be granted (e.g., is requested for grant) in response to the RA initiation message 602. Thus, a subsequent grant may not be constrained to the limited grant provided in the procedure of FIG. 5.

As one example, the RA initiation message 602 may be configured to indicate a type or size of UL grant desired by including a particular preamble sequence. For example, a traditional RA initiation message as presently defined by 3GPP standards may consist of a preamble sequence selected randomly from a set of sequences available in the cell (e.g., based on cyclic shifts and PRACH root sequence index). By contrast, in an implementation of FIG. 6, the UE 106 may intentionally select a particular preamble sequence (e.g., by intentionally selecting a PRACH root sequence index and cyclic shift). Specifically, a first preamble sequence may indicate that the RA initiation message 602 is requesting a limited UL grant. e.g., consistent with the traditional procedure illustrated in FIG. 5. A second, different preamble sequence may indicate that the RA initiation message 602 is requesting an extended UL grant that includes allocation of resources sufficient for the UE 106 to transmit uplink data. In some implementations, the size of the grant requested by the second preamble sequence may be predetermined. In some implementations, other preamble sequences may be used to request UL grants of differing sizes. In some scenarios, the association between the available preambles and the UL grant requests may be configured in a "PRACH-config" information element (IE).

As a second example, the RA initiation message 602 may be configured to indicate a type or size of UL grant desired based on the RACH occasion (RO) in which the RA initiation message 602 is transmitted. A RACH Occasion is an area specified in time and frequency domain that is available for the transmission of RACH preamble. In LTE, there is only one RO specified by RRC message (SIB2) for all the possible RACH preambles. However, in NR, the sync signal (SSB) is associated with different beams, and the UE 106 may select a certain beam and send PRACH using that beam. In order for the network to determine which beam the UE 106 has selected. 3GPP defines a specific mapping between SSB and RO. By detecting the RO on which the UE 106 transmits the PRACH, the BS 102 may determine which SSB Beam the UE 106 has selected. In the present example, the RO selected may additionally indicate the type or size of UL grant desired. For example, transmitting the RA initiation message 602 on a first RO may indicate that the RA initiation message 602 is requesting a limited UL grant. e.g., consistent with the traditional procedure illustrated in FIG. 5. Transmitting the RA initiation message 602 on a second, different RO may indicate that the RA initiation message 602 is requesting an extended UL grant that includes allocation of resources sufficient for the UE 106 to transmit uplink data. In some implementations, the size of the grant requested by the second RO may be predetermined. In some implementations, other ROs may be used to request UL grants of differing sizes. In some scenarios, the association between the available ROs and the UL grant requests may be configured in a "PRACH-config" IE.

Other methods may also, or alternatively, be used to configure the RA initiation message 602 to indicate a type or size of UL grant desired. A notable characteristic of the examples explained above is that the RA initiation message 602 continues to consist of a preamble sequence compatible with existing 3GPP standards. For example, the RA initiation message configured according to any of the above examples does not include additional bits, fields, or other messaging to communicate the type or size of UL grant desired. Specifically, the RA initiation message 602 may not include a BSR, and may not include a MAC header.

In some scenarios, the UE 106 may determine the type or size of UL grant to request based on one or more factors, such as an amount of data buffered for transmission to the BS 102, data type, quality of service (QOS), propagation between the UE 106 and the BS 102, and/or a type of network, cell, or BS. For example, in some scenarios, the UE 106 may request an extended UL grant in response to determining that the BS 102 is a NTN BS, and is therefore expected to manifest high propagation delay. By contrast, the UE 106 may request a limited UL grant in response to determining that the BS 102 is a traditional terrestrial BS. The UE 106 may configure the RA initiation message 602 accordingly.

In response to receiving the RA initiation message 602, the BS 102 may transmit to the UE 102 an UL grant 604. The UL grant 604 may identify UL resources usable by the UE 106 to transmit data consistent with the request indicated by the RA initiation message 602. As illustrated in FIG. 6, the UL grant 604 is an extended UL grant, identifying UL resources usable by the UE 106 to transmit uplink data.

In the scenario of FIG. 6, the UE 102 may, in response to receiving the UL grant 604, transmit to the BS 102 an uplink data message 606. The uplink data message 606 may include some or all of the data buffered by the UE 106 for transmission to the BS 102, using the resources identified in the UL grant 604. The uplink data message 606 may also include a BSR, reporting the amount of buffered data remaining for transmission to the BS 102. For example, the BSR may include, or consist of, a MAC control element (CE) included in the uplink data message 606.

In response to receiving the uplink data message 606 with an included BSR, the BS 102 may transmit an additional UL grant 608, identifying UL resources usable by the UE 106 to transmit at least a portion of the buffered data reported by the BSR.

In response to receiving the additional UL grant 608, the UE 106 may communicate uplink data message 610 to the BS 102. As shown, the uplink data message 610 may represent one or more transmissions of uplink data, and, in some scenarios, may also include one or more responses, such as ACK/NACK messages, from the BS 102.

It should be appreciated that a similar procedure may be used to update a 2-step RA procedure. For example, in a 2-step RA procedure, a RA initiation message may be configured to indicate a type or size of UL grant requested, e.g., using any of the methods described above. In some scenarios, such methods may be used to request a larger grant than may be otherwise requested in a RA initiation message of a 2-step RA procedure.

Figure 7:
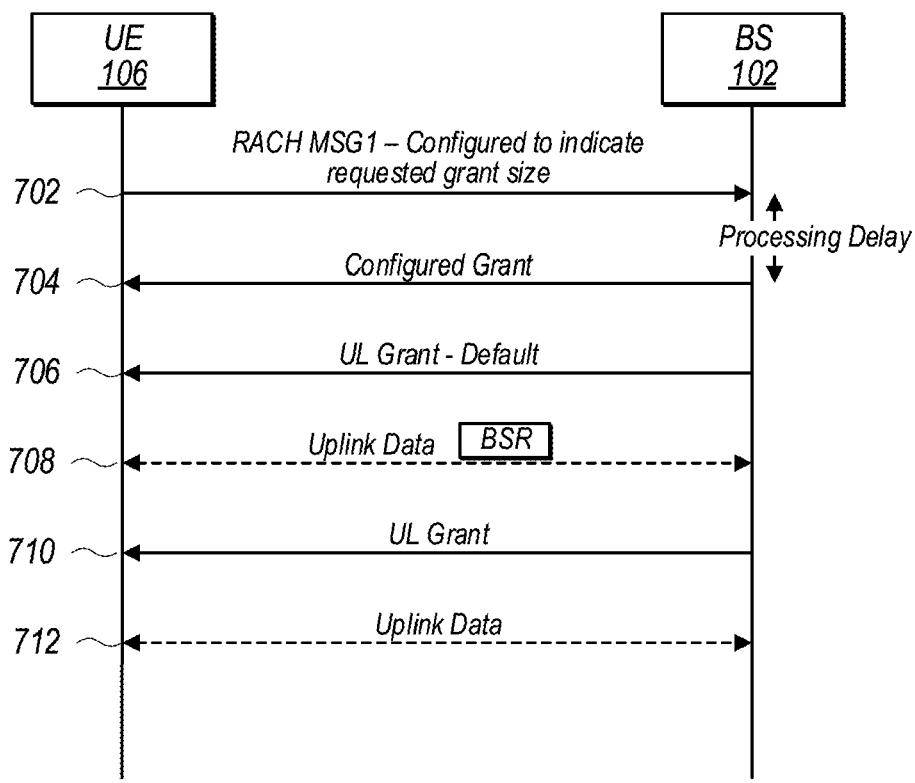
FIG. 7 is a communication flow diagram illustrating an example of an UL traffic call flow, in which a 4-step RA procedure has been modified to provide an additional initial UL grant, according to some embodiments.

FIG. 7—Modified PRACH for Preliminary Uplink Data UL Grant

Another approach to reducing latency between the initial grant request and reception of the uplink data UL grant in high-propagation-delay networks, as well as to reducing burstiness, is to provide an additional fixed initial UL grant immediately in response to an initial request, e.g., before the UE 106 transmits a BSR or similar report/request. This additional initial UL grant may allow the UE 106 to transmit at least a portion of its uplink data earlier than would be allowed according to the procedure illustrated in FIG. 5.

FIG. 7 is a communication flow diagram illustrating an example of an UL traffic call flow; in which a 4-step RA procedure has been modified to provide an additional initial UL grant, according to some embodiments.

As shown, the UE 106 may initiate the call flow by transmitting to the BS 102 a RA initiation message 702, such as a RA preamble, or a similar message. In some scenarios, the RA initiation message 702 may be similar or identical to the initial grant request 502 of FIG. 5.

In response to receiving the RA initiation message 702, the BS 102 may transmit to the UE 106 a configured grant 704. For example, the configured grant 704 may be included in the RA response, or may be broadcast in the SIB. The configured grant 704 may identify UL resources usable by the UE 106 to transmit uplink data. In some scenarios, the size of the configured grant 704 may be fixed or predetermined.

Transmission of the configured grant 704 may be based on one or more factors. For example, the BS 102 may transmit the configured grant 704 in response to receiving the RA initiation message 702 if the BS 102 is of a certain type or is included in a certain type of network, such as a NTN. As another example, the BS 102 may transmit the configured grant 704 in response to receiving the RA initiation message 702 based on cell size or observed propagation delay within the cell.

In response to receiving the configured grant 704, the UE 106 may communicate uplink data message 708 to the BS 102. As shown, the uplink data message 708 may represent one or more transmissions of uplink data, and, in some scenarios, may also include one or more responses, such as ACK/NACK messages, from the BS 102. In some scenarios, the uplink data message 708 may also include a BSR, reporting the amount of buffered data remaining for transmission to the BS 102. For example, the BSR may include, or consist of, a MAC control element (CE) included in the uplink data message 708.

In some scenarios, the configured grant 704 may be configured such that the allocated resources (and thus the uplink data message 708) occur shortly following transmission of a RRC connection setup message (not shown) from the BS 102 to the UE 106. The BS 102 may drop the configured grant 704 in the event that the RRC connection is not completed, e.g., due to contention resolution failure for the UE 106.

In response to receiving the RA initiation message 702, the BS 102 may also transmit to the UE 106 a limited UL grant 706, such as a RA response. In some scenarios, the limited UL grant 706 may be similar or identical to the limited UL grant 504 of FIG. 5. The limited UL grant 706 may identify UL resources sufficient for the UE 106 to transmit a more detailed report or request for resources.

In response to receiving the limited UL grant 706, the UE 106 may complete the RA procedure, e.g., by exchanging RRC connection request and RRC connection setup messages with the BS 102, substantially as outlined in connection with FIG. 5.

In response to receiving the uplink data message 708, including a BSR, the BS 102 may transmit to the UE 106 an additional UL grant 710, which may identify UL resources usable by the UE 106 to transmit uplink data.

In response to receiving the additional UL grant 710, the UE 106 may communicate uplink data message 712 to the BS 102. As shown, the uplink data message 712 may represent one or more transmissions of uplink data, and, in some scenarios, may also include one or more responses, such as ACK/NACK messages, from the BS 102.

The call flow illustrated in FIG. 7 may serve to provide an uplink data grant to the UE 106 at an earlier stage than the call flow illustrated in FIG. 5. This may allow initial data transmission to begin sooner, and also reduce burstiness.

As a possible variation of the call flow illustrated in FIG. 7, the BS 102 could send a configured grant, such as the configured grant 704, in response to receiving from the UE 106 a SR. This would provide similar benefits of allowing initial data transmission to begin sooner and reducing burstiness.

Figure 8:
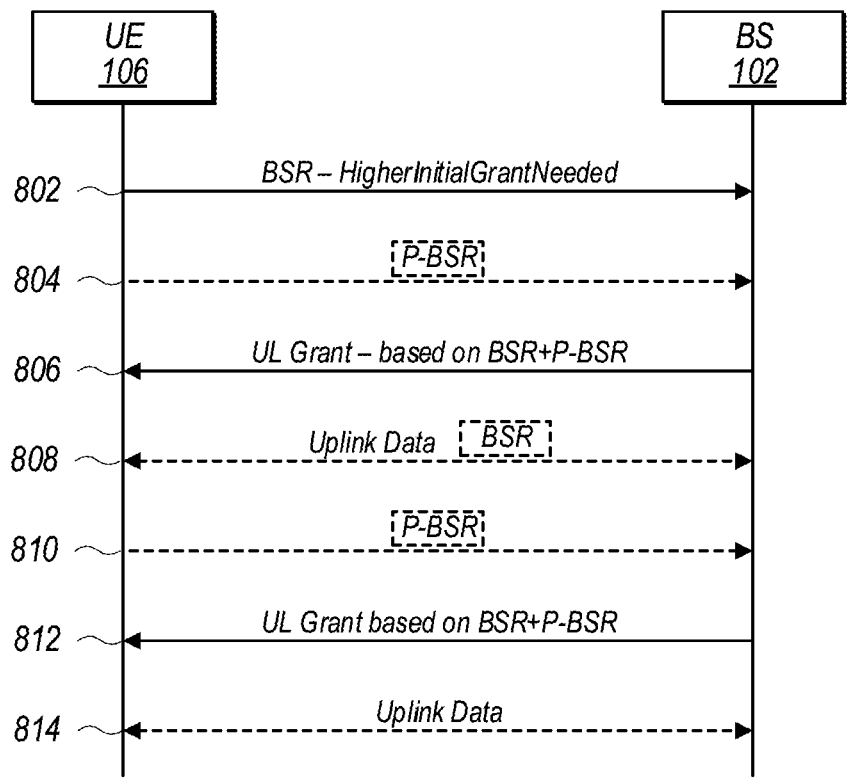
FIG. 8 is a communication flow diagram illustrating an example of an UL traffic call flow, including a BSR update message, according to some embodiments.

FIG. 8—Supplemental BSR

Another approach to reducing latency and smoothing signal flow in high-propagation-delay networks is to provide a BSR update message before expiration of a BSR timer, to signal additional data buffered at the UE. This BSR update message may allow more real-time reporting of buffer status, to compensate for increased propagation delays.

Once RRC connection has been established between the UE 106 and the BS 102, the typical process includes the UE 106 reporting a periodic BSR, which is acted upon by the network. This periodic reporting allows a UE to report buffered data at regular intervals, to receive uplink data grants as needed. However, this procedure was designed and optimized for traditional networks, and may manifest problems if applied without modification in high-propagation-delay networks. For example, if propagation delay is too high, then the time between transmitting a BSR and receiving a grant may become prohibitively long, as large amounts of additional data may enter the buffer in the interim. This may lead to large, infrequent transmission windows.

FIG. 8 is a communication flow diagram illustrating an example of an UL traffic call flow, including a BSR update message, according to some embodiments.

As shown, the UE 106 may transmit to the BS 102 a BSR 802, requesting an uplink data UL grant. The BSR 802 may communicate an amount of data buffered at the UE 106 for transmission to the BS 102.

Subsequent to transmission of the BSR 802, the UE 106 may buffer additional data for transmission to the BS 102. However, the UE 106 may be disallowed to transmit another BSR if the BSR timer has not yet expired. If BSR update messages are allowed and configured for use by the UE 106, then the UE 106 may transmit to the BS 102 a BSR update message 804. e.g., in response to determining that the additional buffered data has reached a threshold amount. The BSR update message 804 may be transmitted prior to expiration of the BSR timer, and may indicate to the BS 102 that additional data has been buffered by the UE 106 subsequent to transmission of the BSR 802. For example, in some scenarios, the BSR update message 804 may indicate that the additional data buffered by the UE 106 has reached at least the threshold amount. In some scenarios, the BSR update message 804 may expressly indicate the amount of the additional data buffered by the UE 106 subsequent to transmission of the BSR 802, or may expressly indicate the total amount of data currently buffered by the UE 106. In some scenarios, the BSR update message 804 may be transmitted only if an UL grant has not yet been received in response to the BSR 802 and/or if the BSR timer has not yet expired since transmission of the BSR 802. In some scenarios, the BSR update message 804 may include, or consist of, a MAC CE.

In some scenarios, the UE 106 may transmit one or more additional BSR update messages (not shown) prior to expiration of the BSR timer. e.g., as additional data is buffered.

In response to receiving both the BSR 802 and the BSR update message 804, the BS 102 may transmit to the UE 106 an UL grant 806, identifying resources allocated for transmission of at least a portion of the buffered data reported in the BSR 802 and the BSR update message 804. In some scenarios, the BS 102 may treat the BSR update message as a long BSR. The size of the uplink grant (or in other words, the quantity of the resources allocated by the uplink grant) may be based on the BSR 802 and the BSR update message 804. For example, the size of the uplink grant may be based on the amount of data buffered at the UE 106 for transmission to the BS 102, as indicated by the BSR 802 and the BSR update message 804.

In response to receiving the UL grant 806, the UE 106 may transmit to the BS 102 an uplink data message 808. The uplink data message 808 may include some or all of the data buffered by the UE 106 for transmission to the BS 102, using the resources identified in the UL grant 806. If the UE 106 has buffered additional data, and if the BSR timer has expired, then the uplink data message 808 may also include a BSR, reporting the amount of buffered data remaining for transmission to the BS 102. For example, the BSR may include, or consist of, a MAC CE included in the uplink data message 808.

Subsequent to transmission of the uplink data message 808 with a BSR, the UE 106 may again buffer additional data for transmission to the BS 102. If the BSR timer has not yet expired, and if an UL grant has not yet been received in response to the uplink data message 808, then the UE 106 may transmit to the BS 102 a second BSR update message 810. The second BSR update message 810 may be similar to the BSR update message 804.

In response to receiving the BSR included in the uplink data message 808 and the second BSR update message 810, the BS 102 may transmit to the UE 106 a second UL grant 812, identifying resources allocated for transmission of at least a portion of the buffered data reported in the BSR included in the uplink data message 808 and the second BSR update message 810, e.g., with the grant size based on the BSR included in the uplink data message 808 and the second BSR update message 810.

In response to receiving the second UL grant 812, the UE 106 may transmit to the BS 102 a second uplink data message 814. As shown in the example of FIG. 8, the second uplink data message 814 may include all of the data buffered by the UE 106 for transmission to the BS 102, using the resources identified in the second UL grant 812, such that the second uplink data message 814 does not include a further BSR. In other scenarios, a further BSR could be included, as needed.

In some scenarios, the network (e.g., the BS 102 and/or other network components) may provide configuration information regarding BSR update messages for use by the UE 106 based on various factors, such as a base station type of the BS 102, a network type, propagation delay between the BS 102 and the UE 106 and/or one or more other UEs, and/or capabilities of the UE 106. For example, the network may configure how many or how frequently the UE 106 may transmit a BSR update message. In some scenarios, the network may approve/disapprove use of BSR update messages by the UE 106 and/or other UEs. In some scenarios, the UE 106 may provide to the BS 102 an indication of whether the UE 106 supports functionality for transmitting BSR update messages, e.g., as a UE capability indication.

In some scenarios, configuration information relating to BSR update messages may be communicated to UEs in the cell, such as the UE 106, prior to transmission of the BSR 802 or prior to transmission of the BSR update message 804. For example, the BS 102 may broadcast configuration information regarding BSR update messages in a predefined system information block (SIB). This may allow reception of the configuration information by a plurality of UEs (e.g., all UEs) in the cell. As another example, the BS 102 may provide configuration information to the UE 106 in an RRC connection setup message (e.g., RA MSG4) or in an RRC reconfiguration message, e.g., based on traffic type indications sent by the UE. This may allow more dynamic reconfiguration of the BSR update messages for an individual UE.

Such traffic type indications may help the network to determine whether the uplink data traffic to be transmitted by the UE 106 is of a type that is likely to rapidly fill a data buffer at the UE 106. The network may therefore provide configuration information for BSR update messages, or may elect to not configure such messages, based on such traffic type indications. For example, the UE 106 may provide an indication of an industrial Internet-of-things (IIOT) traffic type. In response, the network may determine not to configure BSR update messages for the UE 106, because the traffic is of a type that is unlikely to produce high volumes of uplink data. As another example, the UE 106 may provide an indication that its buffer is full. In response, the network may determine to provide an aggressive configuration for BSR update messages, such as a configuration allowing numerous and/or frequent BSR update messages. As yet another example, the UE 106 may provide an indication of some intermediate data type. In response, the network may determine to provide a non-aggressive configuration for BSR update messages, e.g., allowing less numerous and/or less frequent BSR update messages.

In some scenarios, such indications may be provided as an IE. Other formats are also envisioned.

In some scenarios, information regarding configuration information may be communicated to the UE 106 upon transitioning to a high-propagation-delay network. For example, the BS 102 may provide configuration information to the UE 106 in an RRC resume message in response to the UE 106 transitioning to the network of the BS 102, e.g., from a network that is not a high-propagation delay network.

It should be understood that for all of the preceding examples, the BS 102 may, in response to receiving a grant request of any sort (e.g., limited grant request, full grant request, BSR, BSR update message, etc.), assign resources for use by the UE 106 as possible and available. In some scenarios, the BS 102 may not provide an uplink grant of a size requested by the grant request: e.g., the BS 102 may not allocate resources sufficient to transmit all of the data buffered at the UE 106 for transmission to the BS 102. For example, in some scenarios, sufficient resources may not be available.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Any of the methods described herein for operating a user equipment (UE) may be the basis of a corresponding method for operating a base station, by interpreting each message/signal X received by the UE in the downlink as message/signal X transmitted by the base station, and each message/signal Y transmitted in the uplink by the UE as a message/signal Y received by the base station.

Embodiments of the present disclosure may be realized in any of various forms. For example, in some embodiments, the present subject matter may be realized as a computer-implemented method, a computer-readable memory medium, or a computer system. In other embodiments, the present subject matter may be realized using one or more custom-designed hardware devices such as ASICs. In other embodiments, the present subject matter may be realized using one or more programmable hardware elements such as FPGAs.

In some embodiments, a non-transitory computer-readable memory medium (e.g., a non-transitory memory element) may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE) may be configured to include a processor (or a set of processors) and a memory medium (or memory element), where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

The invention claimed is:

1. A base station, comprising:
an antenna;
a radio operably coupled to the antenna; and
a processor operably coupled to the radio;
wherein the base station is configured to:
receive from a wireless device a random access initiation message, wherein the random access initiation message is configurable to use one of a plurality of possible RACH occasions, wherein a characteristic of the random access initiation message is configured to indicate a requested size of a subsequent uplink grant provided by the base station for transmission of uplink data by the wireless device, wherein the characteristic of the random access initiation message is a predefined RACH occasion, wherein a first RACH occasion indicates an uplink grant having a size sufficient for uplink data, and a second RACH occasion indicates an uplink grant having a size sufficient to transmit a buffer status report, but insufficient to transmit uplink data;
in response to the random access initiation message, allocate resources for transmission by the wireless device, wherein the quantity of resources allocated is based on which RACH occasion of the plurality of possible RACH occasions is included in the random access initiation message; and
transmit to the wireless device an uplink grant identifying the allocated resources; and
receive an uplink data message from the wireless device, using the allocated resources.

2. The base station of claim 1, wherein the uplink data message received using the allocated resources further includes a buffer status report, wherein the base station is further configured to:
allocate additional resources for transmission by the wireless device, wherein the quantity of additional resources allocated is based on the buffer status report; and
transmit to the wireless device a second uplink grant identifying the additional allocated resources.

3. A non-transitory computer-readable memory medium storing software instructions executable by a processor of a base station, the software instructions configured to cause the base station to:
receive from a wireless device a random access initiation message, wherein the random access initiation message is configurable to use one of a plurality of possible RACH occasions, wherein a characteristic of the random access initiation message is configured to indicate a requested size of a subsequent uplink grant provided by the base station for transmission of uplink data by the wireless device, wherein the characteristic of the random access initiation message is a predefined RACH occasion, wherein a first RACH occasion indicates an uplink grant having a size sufficient for uplink data, and a second RACH occasion indicates an uplink grant having a size sufficient to transmit a buffer status report, but insufficient to transmit uplink data;
in response to the random access initiation message, allocate resources for transmission by the wireless device, wherein the quantity of resources allocated is based on which RACH occasion of the plurality of possible RACH occasions is included in the random access initiation message; and
transmit to the wireless device an uplink grant identifying the allocated resources; and
receive an uplink data message from the wireless device, using the allocated resources.

4. The non-transitory computer-readable memory medium of claim 3, wherein the uplink data message received using the allocated resources further includes a buffer status report, wherein the software instructions are further configured to cause the base station to:
allocate additional resources for transmission by the wireless device, wherein the quantity of additional resources allocated is based on the buffer status report; and
transmit to the wireless device a second uplink grant identifying the additional allocated resources.

5. A method for performing wireless communications within a high-propagation-delay network, the method comprising:
by a base station:
receiving from a wireless device a random access initiation message, wherein the random access initiation message is configurable to use one of a plurality of possible RACH occasions, wherein a characteristic of the random access initiation message is configured to indicate a requested size of a subsequent uplink grant provided by the base station for transmission of uplink data by the wireless device, wherein the characteristic of the random access initiation message is a predefined RACH occasion, wherein a first RACH occasion indicates an uplink grant having a size sufficient for uplink data, and a second RACH occasion indicates an uplink grant having a size sufficient to transmit a buffer status report, but insufficient to transmit uplink data;
in response to the random access initiation message, allocating resources for transmission by the wireless device, wherein the quantity of resources allocated is based on which RACH occasion of the plurality of possible RACH occasions is included in the random access initiation message; and
transmitting to the wireless device an uplink grant identifying the allocated resources; and
receiving an uplink data message from the wireless device, using the allocated resources.

6. The method of claim 5, wherein the uplink data message received using the allocated resources further includes a buffer status report, the method further comprising:
- allocating additional resources for transmission by the wireless device, wherein the quantity of additional resources allocated is based on the buffer status report; and
- transmitting to the wireless device a second uplink grant identifying the additional allocated resources.

* * * * *